O. L. LOGAN.
VEHICLE SIGNAL.
APPLICATION FILED JUNE 2, 1917.

1,320,252.

Patented Oct. 28, 1919.
2 SHEETS—SHEET 2.

WITNESSES
C. F. Rudolph

INVENTOR
O. L. Logan,
BY Victor J. Evans
ATTORNEY

UNITED STATES PATENT OFFICE.

OSCAR L. LOGAN, OF LONGMONT, COLORADO, ASSIGNOR OF ONE-HALF TO EVERETT W. WHEELER, OF LONGMONT, COLORADO.

VEHICLE-SIGNAL.

1,320,252.  Specification of Letters Patent.  Patented Oct. 28, 1919.

Application filed June 2, 1917. Serial No. 172,454.

*To all whom it may concern:*

Be it known that I, OSCAR L. LOGAN, a citizen of the United States, residing at Longmont, in the county of Boulder and State of Colorado, have invented new and useful Improvements in Vehicle-Signals, of which the following is a specification.

This invention relates to improvements in vehicle signals and has for one of its objects, the provision of a signaling device, especially adapted for automobiles by means of which the driver may signal his intentions of turning or stopping to the driver of a following vehicle.

Another and more specific object of the invention is to provide a signal of this nature comprising a rotatable element having a plurality of signaling faces which may be selectively brought into signaling position by means of flexible connections operated by the driver of a vehicle.

The invention also aims to generally improve vehicle signals to render them more practical, useful and commercially desirable.

With these and other objects in view as will become more apparent as the description proceeds, the invention consists in certain novel features of construction, combination and arrangement of parts as will be hereinafter fully described, illustrated and claimed.

In the drawings,

Fig. 3 is an enlarged detail view of that portion of the signaling apparatus mounted on the steering post.

Figure 1:
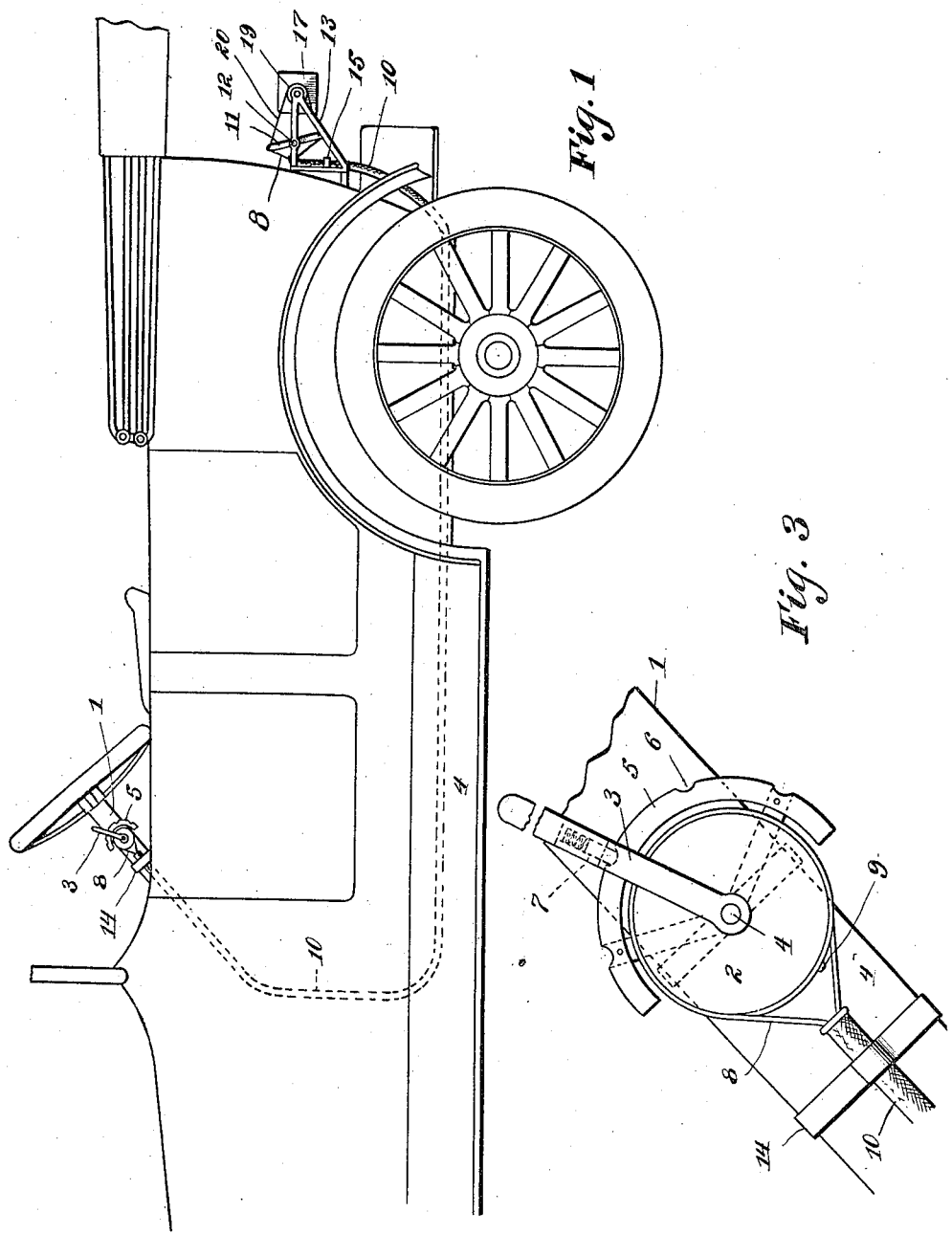
Figure 1 is a side elevation of an automobile equipped with my improved signal.
Figure 2:
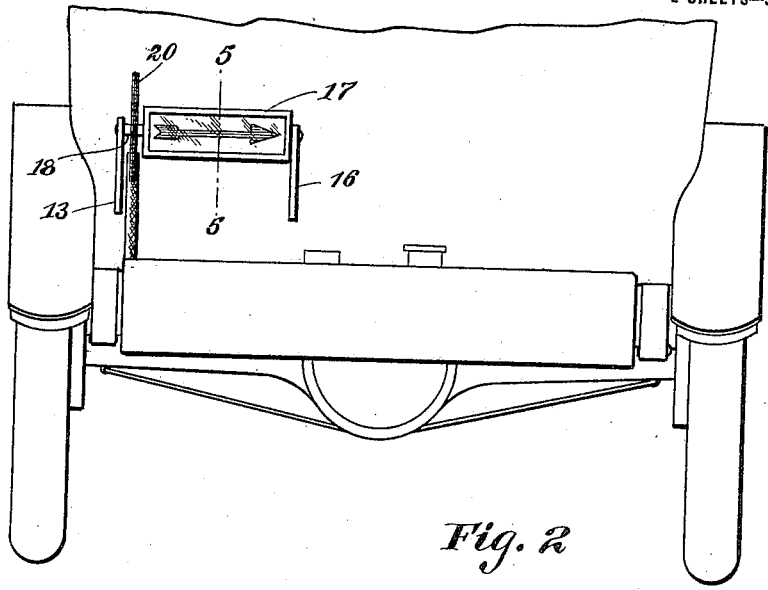
Fig. 2 is a rear elevation of the machine and signal.
Figure 4:
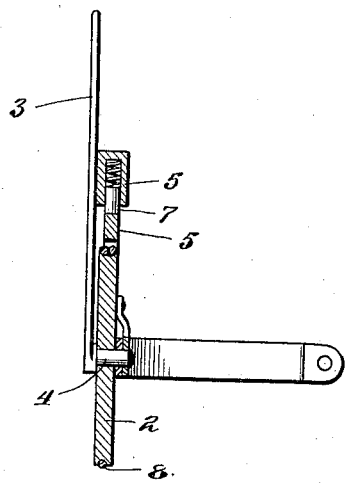
Fig. 4 is a section on the plane of characters 4—4 of Fig. 3.
Figure 5:
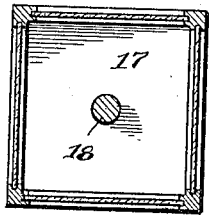
Fig. 5 is a section on the plane of line 5—5 of Fig. 2.

Referring in detail to the drawings by numerals, 1 designates the steering post of an automobile and to this post is connected a drum 2 which may be rotated by a hand lever 3. The lever is fixed to a shaft 4 which rotatably supports the drum on the steering post. An arcuate latch plate 5 is mounted above the drum and is formed in its outer peripheral edge with four notches 6 which are adapted to engage the spring pressed bolt 7 carried on the lever 3 to hold the lever in adjusted position. A wire 8 is given a couple of turns around the drum and secured against slipping with respect to the drum by a screw 9. From the drum, the two lengths of wire are carried through a protective tubing 10 to a lever 11 mounted at the rear of the machine. The lever is pivoted centrally of its ends as at 12 to the upper arm of a triangular bracket 13 which is suitably secured to the rear of the vehicle and which extends rearwardly therefrom. The protective tubing 10 is held to the steering post by a strap 14 and is trained through strips or loops 15 on the bracket 13 as shown. The rear terminals of the wire are connected to the lever 11 on opposite sides of its pivotal point and relatively close thereto so that a slight movement of the wires will be sufficient to swing the lever through a relatively large arc.

A second triangular bracket 16, similar to the bracket 13 is provided to coöperate therewith in supporting a signal 17. The signal is preferably rectangular in cross section having four indicating side faces which may be provided with suitable signaling indicia such for instance as arrows, pointing to the right and left and the word "Stop". One of the signal faces may be left blank. The signal is mounted on a shaft 18 supported by the brackets 13 and 16 and concentric on this shaft and fixed to the signal is a drum 19 around which is wound a chain 20, the ends of which are connected to the lever 11 near its terminals. The drums and the connection to the lever 11 are so arranged and proportioned that when the operating lever 3 is moved from one notch to the next, the signal will be given a quarter turn.

The flexible connection between the forward drum and the lever 11 forms a very practical means for connecting these two elements, since it is adjustable to any make of car and since it may be easily installed thereon to operate satisfactorily.

From the foregoing description taken in connection with the accompanying drawings, it will be evident that I have provided a very practical and useful signal which may be conveniently operated by a vehicle driver to signal his intentions to drivers of following vehicles.

While I have shown and described the preferred embodiment of my invention, it will be clearly understood that I do not wish to be limited to this construction, but may make such changes as will fall within the scope and spirit of the invention as claimed.

What I claim is:

A device of the class described comprising a pair of brackets, a casing journaled in said brackets, a lever pivotally mounted in one bracket intermediate its ends, a cable having its ends connected with the ends of the lever and passing around the casing, and a pair of cables having their ends connected with the lever to each side of the pivotal point thereof, and means for operating said cables to rock the lever.

In testimony whereof I affix my signature.

OSCAR L. LOGAN.

Copies of this patent may be obtained for five cents each, by addressing the "Commissioner of Patents, Washington, D. C."